June 2, 1970     J. D. HELBIG     3,515,074

EQUIPMENT FOR LOADING, TRANSPORTING AND UNLOADING PASSENGERS

Filed Oct. 14, 1968

INVENTOR.
Jim D. Helbig
BY
ATTORNEY

United States Patent Office 3,515,074
Patented June 2, 1970

---

3,515,074
EQUIPMENT FOR LOADING, TRANSPORTING AND UNLOADING PASSENGERS
Jim D. Helbig, 50 S. 17th Ave. Drive,
Brighton, Colo. 80601
Filed Oct. 14, 1968, Ser. No. 767,210
Int. Cl. B61b 1/00; E01f 1/00
U.S. Cl. 104—28                                      11 Claims

ABSTRACT OF THE DISCLOSURE

Equipment for rapid loading, transporting and unloading of skiers and other passengers, comprising a loading structure and a motor vehicle, in which the loading structure is provided with a plurality of parallel separate stalls or aisles each provided with an entrance and means for admitting only a predetermined number of passengers equal in number to the seats in a row of seats in the vehicle into which the passengers waiting in the loading stalls can pass through side openings in the vehicle which register with the stalls of the loading structure. The loading structure may also function for unloading of passengers, or separate loading and unloading structures may be provided for communication with a parked vehicle having side openings in each of its side walls.

---

This invention relates to equipment for rapid loading, transporting and unloading passengers, particularly well adapted for transporting skiers to ski slopes preparatory to their down-slope passage on skis. The equipment also is adapted to transport passengers speedily from one place to another wherever many persons congregate for travel, and is not confined to the carrying of passengers to the tops of ski slopes.

The main object of the invention is to provide means for orderly and rapid loading of passengers into a vehicle and rapid unloading of the passengers at destination, without the aid of attendants.

The equipment provides essentially a loading structure, a vehicle and an unloading structure. The word structure is used to comprise a floored building or barricaded surface divided into an entrance or exit area and a plurality of parallel stalls or aisles barricaded from each other. Each aisle communicates with the entrance area at one end of the aisle and with side openings in the vehicle at the other end of the aisle. The vehicle is provided with a plurality of side openings, and with rows of seats extending transversely of the vehicle, each rows of seats having an adjacent transversely extending aisle which is accessible through one of said side openings in the vehicle walls, and in alignment with one of the stalls or aisles of the passenger structure.

Each of the passenger structure aisles is provided with means for admitting a predetermined number of passengers into the aisle and for preventing admission of more than the predetermined number of passengers. The number to be admitted to each aisle equals the number of seats accessible to the vehicle aisle which communicates with the aligned passenger structure aisle.

The loading structure and the vehicle may also each be provided with an area for holding a ski equipment cart or other articles such as luggage. The respective areas communicate with each other through an opening in the vehicle side wall. The ski cart may be provided with numbered compartments into which skiers place their skis, poles, etc. before entering one of the plurality of loading aisles leading to a row of seats in the vehicle. The ski or luggage cart may be moved manually into the vehicle or automatically operable means may be provided for that purpose.

At destination, an unloading platform may be located at the side of the arriving vehicle opposite the loading side, or one structure may function as both the loading and unloading platform. For unloading, the means limiting the number of passengers admitted to the loading aisle may be made inoperative so as not to hinder free movement of passengers out of the vehicle, through the loading aisles and into the exit area of the building or platform. The ski or luggage cart in the vehicle may be moved out of it manually or automatically onto the structure area designed for that purpose. When the cart has been unloaded by passengers claiming their property, the empty cart will be ready for use again by the incoming passengers.

At present the loading of skiers into individual chair lifts for transportation to the top of a ski slope is a slow and tiring process in which passengers are subjected to the elements and the discomfort of crowding and uncertainty of accommodations. It is not uncommon for skiers to wait an hour or longer for opportunity to be "lifted" to the top for a five minute down-slope trip on skis. The equipment herein shown and described is designed to replace conventional ski-lift apparatus, to greatly speed the loading, transportation and unloading of passengers and ensure the comfort and safety of passengers.

Figure 1:
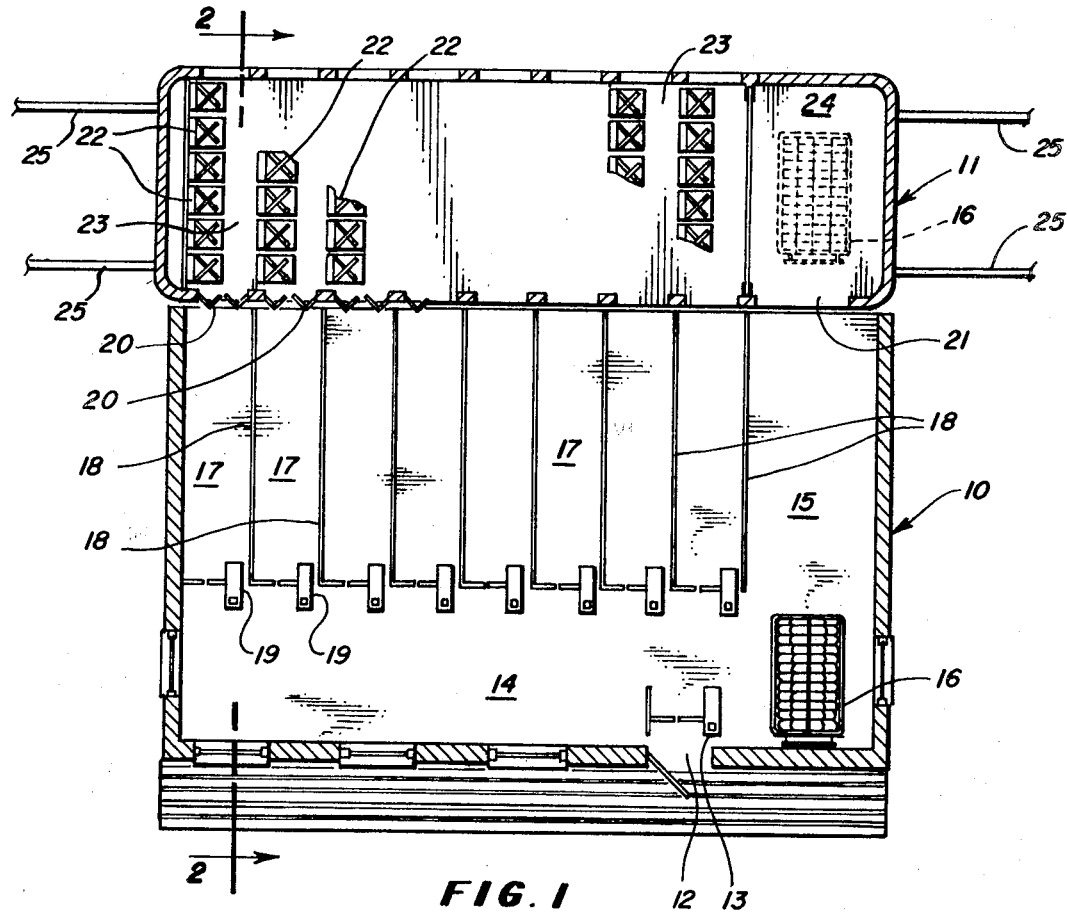
FIG. 1 is a plan view of a loading structure and vehicle embodying my invention.
Figure 2:
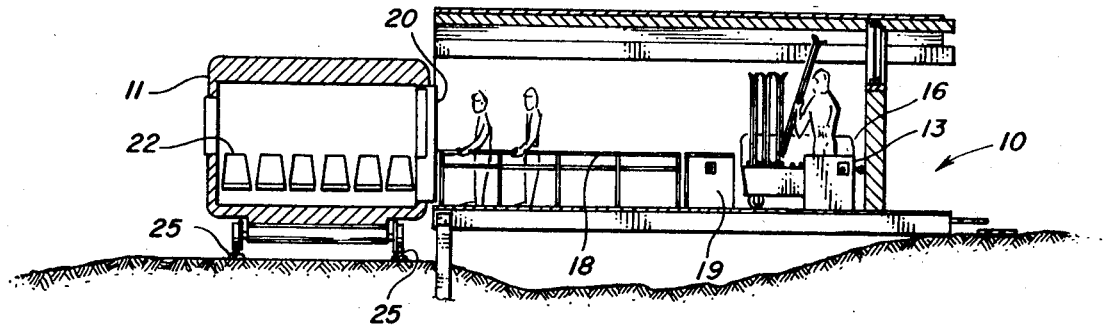
FIG. 2 is a transverse vertical sectional view of the same.

In that embodiment of the invention shown in the drawing, a building designated 10 is adjacent a motor vehicle 11 which may be of any suitable length and width. The building 10 has an entrance 12 and turnstile 13 adjacent the entrance. The turnstile may be coin actuated to permit only paying passengers to enter the entrance area 14. An area 15 adjacent one side of the entrance area 14 has space for a ski or luggage cart 16 and for its movement to and from the vehicle 11. As heretofore stated, a structure or platform properly barricaded may be substituted for the building 10.

Within the building 10 are a plurality of aisles 17 parallel to each other and separated by walls or railings or fencing 18 to form stalls which confine passengers within an aisle and prevent passage into another aisle. At the entrance of each aisle 17 a turnstile 19 permits entry of a predetermined number of passengers and prevents more than the predetermined number from entering. The turnstiles 19 may be reversible so that the building or platform 10 may be used both for loading and unloading passengers.

The building 10 has openings in its wall registering with the aisles 17, and the vehicle 11 has similar openings in a side wall. When the vehicle is standing in its loading position adjacent the building 10, the openings register with each other. The vehicle openings can be closed by folding doors 20. When the doors 20 are opened, each aisle 17 communicates with the interior of the vehicle and the cart 16 can pass through the opening 21 into the vehicle. Passengers in each aisle 17 move to a seat 22 in one row of seats through vehicle aisle 23, and the cart 16 can move into the area 24 in the vehicle. Tracks for the vehicle are designated 25.

In the embodiment shown, each row of seats in the vehicle consists of six seats 22 so located and constructed that they confine six passengers to one row and aisle 23. Likewise the turnstile 19 at the entrance to each aisle 17 is pre-set to permit entrance of only six passengers to the aisle to await arrival of the vehicle. If the arriving vehicle carries passengers, they may be unloaded to a platform on the side opposite the building 10, in which case the vehicle would be provided with side openings for each aisle 23 opposite the loading side. If the loading side is to be used also for unloading, passengers are not permitted to enter aisles 17 until the vehicle has been unloaded. When used as equipment for transportation of skiers, the construction shown is used almost exclusively as a loading building or platform 10 and the vehicle carries passengers to the top of a ski slope, from which skiers ski down to the area of the loading building for repeating the trip to the top of the ski slope in the vehicle 11.

By the use of the equipment shown, waiting passengers are protected from the elements and from crowding and pushing while standing in the individual aisles 17 with a predetermined limited number of other persons equal to the number of seats in the aligned rows of seats 22 and aisles 23 in the vehicle. As stated, the turnstile 13 limits entry into the loading structure to paying passengers. Preferably, the turnstile 13 also is provided with means for limiting entry into the loading structure to the persons equal in number to the total number of seats in the vehicle.

The tracks 25, obviously, may be between any loading and unloading areas, particularly between a loading area adjacent a ski slope and an unloading area at the top of the slope.

I claim:
1. Equipment for loading, transporting and unloading passengers comprising
   (a) a motor vehicle provided with a plurality of parallel rows of seats and having an entrance opening in a side wall of the vehicle for access to each row of seats,
   (b) a passenger loading structure provided with a plurality of parallel, separate stalls each provided with an exit communicating with one of the vehicle openings for passage of passengers from the loading structure to one of the rows of seats and each provided with an entrance, and
   (c) means at each entrance to a stall admitting only a predetermined number of passengers and preventing passengers in excess of the predetermined number from entering the stall.

2. The equipment defined by claim 1, in which the means at each entrance to a stall admits only a number of passengers equal to the number of seats in one row in the vehicle.

3. The equipment defined by claim 1, in which the means at each entrance to a stall admitting only a predetermined number of passengers is a coin actuated turnstile.

4. The equipment defined by claim 3 in which the turnstile is reversible to permit passengers leaving the vehicle to pass through and out of the stall.

5. The equipment defined by claim 1, in which the loading structure includes an entrance area leading to the plurality of stalls and a side area for housing a cart arranged to hold skis or luggage, and the vehicle having a side wall opening for passage of the cart into the vehicle.

6. The equipment defined by claim 1, in which the vehicle has side walls provided with oppositely located side openings each providing access to one row of seats, and which includes a passenger unloading structure located to receive passengers through the side openings at one side of the vehicle opposite the loading side.

7. The equipment defined by claim 1, in which the stalls are separated from each other by barricading devices which prevent passage from one stall to another.

8. Equipment for rapid loading, transporting and unloading of passengers comprising
   (a) a vehicle track between a loading area and an unloading area at the top of a ski slope,
   (b) a motor vehicle on the track provided with a plurality of parallel rows of seats extending transversely of the vehicle, said vehicle having an entrance opening in a side wall for access to each row of seats,
   (c) a passenger loading structure adjacent the track provided with a plurality of parallel, separate stalls each provided with an exit communicating with one of the vehicle openings for passage of passengers from the loading structure to one of the rows of seats and each provided with an entrance, and
   (d) means at each entrance to a stall admitting only a predetermined number of passengers and preventing passengers in excess of the predetermined number from entering the stall.

9. The equipment defined by claim 8, in which the means at each entrance to a stall admits only a number of passengers equal to the number of seats in one row in the vehicle.

10. The equipment defined by claim 8, in which the vehicle includes an area arranged to house a ski cart and having a side opening, and the loading structure includes an entrance area leading to the plurality of stalls and a side area for housing a ski cart, said side area having an opening registering with the vehicle opening for passage of a ski cart into the vehicle.

11. The equipment defined by claim 1, in which the loading structure includes an entrance area leading to the plurality of stalls, an entrance to said entrance area, and means at the entrance to said entrance area admitting only persons equal in number to the total number of seats in the vehicle.

References Cited

UNITED STATES PATENTS 3,285,194  11/1966  Clejan _____ 104—27
3,397,649  8/1968  Pfeffer _____ 104—28

JOSEPH R. LECLAIR, Primary Examiner

S. E. LIPMAN, Assistant Examiner

U.S. Cl. X.R.
52—33; 104—30